United States Patent [19]
Gerlach

[11] Patent Number: 5,646,732
[45] Date of Patent: Jul. 8, 1997

[54] COORDINATE MEASURING SYSTEM

[76] Inventor: Dieter Gerlach, An den Teichen 11a, D.-31177 Harsum, Germany

[21] Appl. No.: 639,103

[22] Filed: Apr. 22, 1996

[30] Foreign Application Priority Data

Apr. 21, 1995 [DE] Germany .................. 195 14 815.0

[51] Int. Cl.$^6$ .................. G01B 11/03; G01B 21/04
[52] U.S. Cl. .................. 356/373; 356/375; 33/707; 33/503
[58] Field of Search .................. 356/373, 375, 356/376; 33/503, 504, 556, 558, 707, 832

[56] References Cited

U.S. PATENT DOCUMENTS

| | | |
|---|---|---|
| 4,587,622 | 5/1986 | Herzog . |
| 5,017,013 | 5/1991 | Kellner .................. 356/373 |
| 5,131,166 | 7/1992 | Weber .................. 33/832 |
| 5,134,782 | 8/1992 | Breyer et al. .................. 33/503 |

*Primary Examiner*—F. L. Evans
*Attorney, Agent, or Firm*—Evenson, McKeown, Edwards & Lenahan P.L.L.C.

[57] ABSTRACT

A coordinate measuring system (1) having a pickup head (8) which can travel on a carriage (6) on a guide unit (5) along a scale (7), and a scanner (3) for measuring a workpiece (12). The scanner (3) is mounted on a rotating body (2) which is arranged to be pivotable about an axis (4) on a carriage (6) which can travel along the guide unit (5). Pickup heads (8) on the rotating body (2) on both sides of the central axis (4) are associated with the scale (7) and are disposed at a distance from the scale (7) and the axis (4) such that, during the measurement, the rotating body (2) is displaced parallel to the scale, while for the rough positioning one coordinate is detected and evaluated as a measure lengthwise of the scale (7), and after the scanner (3) has been applied to the surface of the workpiece (12) the rotating body (2) pivots about its axis (4), and for the fine positioning a coordinate is detected and evaluated at right angles to the surface of the scale (7) as a measure of the distance of the pickup heads (8) from the scale (7). Thus in the coordinate measuring system of the invention, the precision of measurements can be increased by using a comparatively simple means to detect and evaluate a rotational movement of the scanner.

5 Claims, 2 Drawing Sheets

COORDINATE MEASURING SYSTEM

BACKGROUND OF THE INVENTION

This invention relates to a coordinate measuring system with a measuring head that can travel on a carriage on a guide unit along a scale and with a scanner for measuring a workpiece, the scanner being mounted on a rotating body which is arranged to be pivotable about an axis on a carriage which can travel along the guide unit.

As a result of new industrial manufacturing processes and more stringent requirements with regard to production measurement techniques used therein, coordinate measuring apparatus are being used with increasing frequency on production lines. A new measurement technique based on a photogrammetric measuring principle has been developed which makes it possible to perform precision measurements even outside of any fine measurement room. This technique is described in U.S. Pat. No. 5,017,013. The basis of the new method for measuring length is a photogrammetric principle which permits simultaneous determination of two coordinates by a single recorder. In this method, the quality of the measurements does not depend on the precision of the track on which the recorder travels.

The known apparatus essentially comprises a scale of lengths and a camera. During the measurement procedure, the marks on the scale are projected by an optical system on a CCD cell. The position and height of the focal center of the camera are determined from the measurement signals by means of a computer. These position and level determinations are performed simultaneously for each measurement time point, The use of special coding of the lines on the scale makes possible an absolute determination of the position coordinate. Thus, the possibility of cumulative error is excluded. Using this principle of measurement it is possible to create a measuring system with an absolute scale, which simultaneously supplies a coordinate in the lengthwise direction and a coordinate at right angles to the scale surface. The simultaneous detection of the second coordinate makes it possible through the use of a computer to measure inaccuracies and wear on guides. Thus, the precision of measuring and production machines becomes independent of the quality of the mechanical guiding means. Machines equipped in this manner are capable of compensating for their own errors.

On the other hand, U.S. Pat. No. 5,131,166 discloses a coordinate measuring apparatus with a measuring head which can travel on a carriage on a guide unit along a scale, and with a scanner for measuring a workpiece, in which the scanner is mounted on a rotating body which is arranged to be pivotable about an axis on a carriage which can travel on the guide unit. The description relating to FIG. 10 of this patent furthermore describes an additional selsyn for measuring the rotation in an additional plane. It is disadvantageous that the fine positioning is performed exclusively by a known selsyn because the accuracy achievable in this case is only in the micrometer range.

U.S. Pat. No. 5,134,782 also describes a measuring system with a rotating scanner. Again in this apparatus, the evaluation is performed by means of a known rotational position indicator or selsyn.

Finally, U.S. Pat. No. 4,587,622 discloses a method and apparatus for determining and correcting guidance errors. In this case the swinging movements are small, and the swinging movement is determined with two incremental linear pickups. Here too an accuracy of only about 3 micrometers can be achieved, which can be approximated by using a compensation polynomial of the 8th degree with a bandwidth of ±0.4 μm.

SUMMARY OF THE INVENTION

It is the object of the present invention to further increase the precision of measurements made by means of measuring systems of the foregoing type.

This object is achieved by providing a coordinate measuring system comprising a pair of pickup heads on a carriage which is movable on a guide unit along a scale associated with the pickup heads, and a scanner for measuring a workpiece, the scanner being mounted on a rotatable body which is arranged to be pivotable about an axis on the carriage, wherein the pickup heads are mounted on the rotating body on both sides of the axis and are spaced a distance from the scale and from the axis; and the pickup heads comprise cameras for determining the longitudinal movement of the carriage and the rotation of the rotating body, in which cameras specific markings on the scale are projected by an optical system onto a focal plane formed by a CCD cell; the position and height of the projection center of the pickup heads being determined by means of a computer from measurement signals from the cameras, such that during the measurement procedure the rotating body is displaced parallel to the scale, whereby for rough positioning one coordinate is detected and evaluated as the dimension lengthwise of the scale; and after the scanner is placed in contact with a surface of the workpiece, the rotating body pivots about the axis, and in order to achieve fine positioning a coordinate is detected and evaluated as a measure of the distance between the pickup heads and the scale.

Due to the fact that pickup heads associated with the scale are disposed on the rotating body on both sides of the axis of rotation spaced a distance from the scale and from the axis of rotation, and the fact that the pickup heads are configured as measuring cameras for detecting the longitudinal movement of the carriage in which specific marks of the scale are projected by means of an optical system onto a focal plane formed by a CCD cell, and the measurement signals are used for determining the position and height of the projection center of the pickup heads by means of a computer, such that, during the performance of the measurement the rotating body is displaced parallel to the scale, whereby for rough positioning a coordinate is detected and evaluated as a dimension in the direction of the length of the scale, and after the scanner has been placed in contact with the surface of the workpiece, the rotating body pivots about its axis, and in order to achieve fine positioning a coordinate at right angles to the surface of the scale is detected and evaluated as a measure of the distance of the pickup heads from the scale, it is now additionally possible to detect and evaluate the turning movement of the scanner, i.e., the rotating body, in order to achieve fine positioning.

The invention is based upon the recognition that, by arranging two pickup heads on two lever arms which can be rotated by the scanner corresponding to the deflection of the scanner, a relatively great and also very precisely measurable change in spacing can be achieved. By providing long lever arms a variation of distance can be achieved which can be increased almost to any desired degree, and which is directly dependent upon the measuring movement, thus making it possible to increase to almost any desired degree the precision of the measurements, using very simple means. It is especially advantageous if the pickup heads are configured as pickup cameras in which specific marks of the scale are projected by means of an optical system onto a focal plane formed by a CCD cell, and from the measurement signals the position and height of the projection center of the cameras are determined by means of a computer. In this case the initially mentioned advantages of this type of measurement system can also be fully utilized.

Within the scope of the invention provision is furthermore made for at least one spring having an adjustable return force to engage the rotating body, which permits the setting of a specific measuring force. Such a specific measuring force makes is possible to adapt the contact pressure of the scanner of the measuring system against a workpiece very precisely to particular requirements. It is especially possible in this way to calibrate the contact pressure and thus obtain repeatable results under always identical conditions. All in all, this measure also leads to an increase in the precision of the measurements.

In order to adapt the apparatus to the dimensions of the workpieces which are to be measured and in order to facilitate selection of the required points of measurement, vertical drives can be arranged on both sides of the guide unit for the purpose of adjusting the position of the scanner at right angles to the plane of measurement.

In another embodiment of the invention, the workpiece being measured is fastened on a turntable by means of a vacuum. The turntable is especially advantageous when rotation bodies are to be measured in different directions. Vacuum fastening also provides a rapid and stress-free way of securing workpieces.

BRIEF DESCRIPTION OF THE DRAWINGS

The invention will be described hereinafter in further detail with reference to illustrative preferred embodiments shown in the accompanying drawings in which.

DETAILED DESCRIPTION OF PREFERRED EMBODIMENTS

Figure 1:
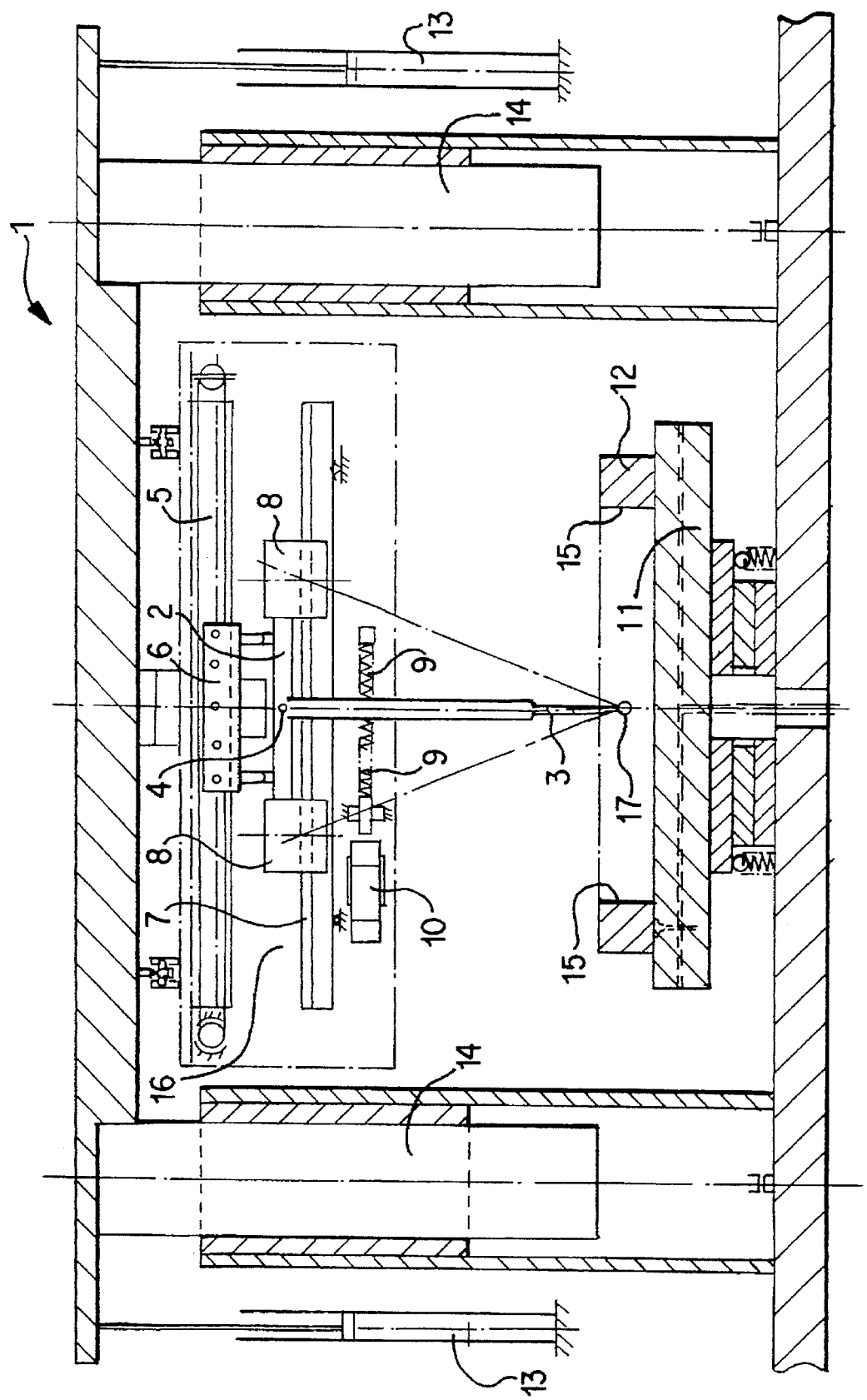
FIG. 1 is a side view of a coordinate measuring apparatus according to the invention.

FIG. 1 of the drawing shows a coordinate measuring apparatus 1 comprising a rotating body 2 having a scanner 3 mounted thereon. The rotating body 2 with the scanner 3 is arranged so as to be pivotable about an axis 4 on a carriage 6 which can travel along a guide unit 5. On both sides of the axis of rotation 4, pickup heads 8 associated with a scale 7 are arranged spaced a distance from the scale 7 and from the axis 4. The scale 7 is mounted on the housing 16 of the coordinate measuring apparatus 1. Springs 9 engage both sides of the scanner 3, and spring force of the springs 9 acting on the scanner 3 is adjustable by means of adjusters 10.

A workpiece 12 having surfaces 15 to be measured is disposed within a hollow cylinder on a turntable 11 within reach of the scanner 3. The workpiece 12 is secured to the turntable 11 by means of a vacuum. Pneumatic jacks 13 are also provided on both sides of the guide unit 5 each supporting a vertical drive 14 which enables the measuring position of the scanner 3 to be adjusted at right angles to the measurement plane of the workpiece 12. The pneumatic jacks 13 provide damping of the adjusting movements and thus facilitate a smooth adjustment.

The pickup heads 8 are configured as cameras in which specific marks of the scale 7 are projected by an optical system onto a focal plane formed by a CCD cell. The measurement signals are used to determine the position and height of the projection center of the pickup heads 8 by means of a computer not shown in the drawing.

Figure 2:
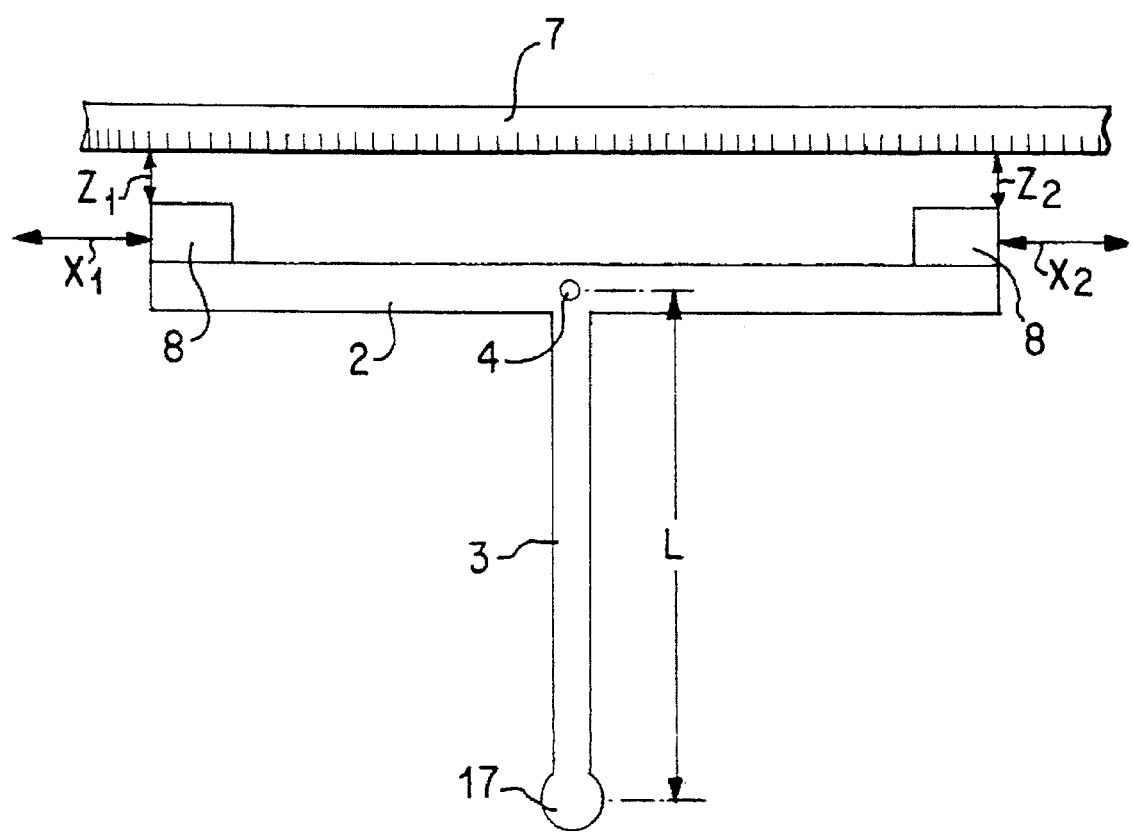
FIG. 2 is an enlarged schematic representation of the revolving body with the measuring heads and the scale.

FIG. 2 shows the coordinates $X_1$, $X_2$ and $Z_1$ and $Z_2$ which can be detected for the measurement by the pickup heads 8 and which establish the position and height of the projection center of each of the cameras used here as pickup heads 8. The distance between the axis 4 and a probe or wand 17 of the scanner 3 that is in contact with the surface 15 of the workpiece 12 is represented by the letter L.

Before a measurement is performed, the force of the springs 9 acting on the scanner 3 is set by means of the adjusters 10. Thus the measuring force with which the scanner 3 engages the surfaces 15 of the workpiece 12 for measurement during the fine positioning can be adjusted. Then the scanner 3 is moved into the plane being measured on the workpiece 12 by the vertical drive 14 engaging the guide unit. Then, the carriage 6 is moved on the guide unit 5 to bring the scanner 3 into contact with the surfaces 15 inside of the workpiece 12. Thus the scanner 3, together with its rotating body 2 and the pickup heads mounted thereon are rotated about its axis 4. In this range of measurement, this results in a relatively great change in the distance of the pickup heads 8 from the scale 7 toward the Z coordinates even for a slight displacement of the rotating body 2 toward the X coordinates, i.e., parallel to the scale 7. This change in distance can be very precisely determined in addition to the movement in the direction of the X coordinates. As the distance between the pickup heads 8 and the axis of rotation 4 increases, the change in distance relative to the turning angle of the scanner 3 increases, so that the precision of the measurement can be further increased with very simple means.

The position is determined by the pickup heads 8 as a result of the X and Z coordinates being read and evaluated according to the following formula:

$$X=(X_1+X_2)/2+L\times(Z_2-Z_1)/X_2-X_1).$$

During the next movement of the scanner 3 on the opposite surface 15 of the workpiece 12, an evaluation is preferably made of the X coordinates, in which case a rough positioning is quite adequate. On account of the constant, additional and simultaneous determination of the Z coordinates, however, it is always possible by means of the computer to detect, for example, topographical inaccuracies of the scale 7 in its straightness, and to determine the clearance or play in the guides. Thus the accuracy of the measuring apparatus is independent of the quality of the mechanical guides. Machines equipped in this manner are thus able to compensate their own errors. Absolute accuracies of up to 100 nm can be achieved.

As soon as the scanner 3 again is brought with its probe 17 into contact with a surface 15 of the workpiece 12, the fine positioning procedure described above is repeated.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coordinate measuring system comprising a pair of pickup heads on a carriage which is movable on a guide unit along a scale associated with the pickup heads, and a scanner for measuring a workpiece, said scanner being mounted on a rotatable body which is arranged to be pivotable about an axis on the carriage, wherein the pickup heads are mounted on the rotating body on both sides of the axis and are spaced a distance from the scale and from the axis; and said pickup heads comprise cameras for determining the longitudinal movement of the carriage and the rotation of the rotating body, in which cameras specific markings on the scale are projected by an optical system onto a focal plane formed by a CCD cell; the position and height of the projection center of the pickup heads being determined by means of a computer from measurement signals from the cameras, such that during the measurement procedure the rotating body is displaced parallel to the scale, whereby for rough positioning one coordinate is detected and evaluated as the dimension lengthwise of the scale; and after the scanner is placed in contact with a surface of the workpiece, the rotating body pivots about the axis, and in order to achieve fine positioning a coordinate is detected and evaluated as a measure of the distance between the pickup heads and the scale.

2. A coordinate measuring system according to claim 1, wherein a pickup head is disposed on each side of the axis of the rotatable body, and each pickup head comprises a measuring camera.

3. A coordinate measuring system according to claim 1, further comprising at least one spring having an adjustable return force engaged with the scanner to facilitate adjustment of a specific measuring force.

4. A coordinate measuring system according to claim 1, further comprising vertical drives arranged on both sides of the guide unit for controllably adjusting the vertical measuring position of the scanner at right angles to the plane of measurement.

5. A coordinate measuring system according to claim 1, further comprising vacuum means for fastening a workpiece, which is to be measured, to a turntable.

* * * * *